United States Patent
Yang et al.

(10) Patent No.: US 9,285,926 B2
(45) Date of Patent: Mar. 15, 2016

(54) INPUT DEVICE WITH OPTICAL MODULE FOR DETERMINING A RELATIVE POSITION OF AN OBJECT THEREON

(75) Inventors: Feng-Cheng Yang, Hsin-Chu (TW); Ching-Lin Chung, Hsin-Chu (TW); Hsin-Chia Chen, Hsin-Chu (TW); Hui-Hsuan Chen, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 397 days.

(21) Appl. No.: 13/554,052

(22) Filed: Jul. 20, 2012

(65) Prior Publication Data

US 2013/0127713 A1 May 23, 2013

(30) Foreign Application Priority Data

Nov. 17, 2011 (TW) .............................. 100141933 A

(51) Int. Cl.
*G06F 3/042* (2006.01)
(52) U.S. Cl.
CPC .... *G06F 3/0421* (2013.01); *G06F 2203/04109* (2013.01)
(58) Field of Classification Search
None
See application file for complete search history.

(56) References Cited

U.S. PATENT DOCUMENTS

| | | | | |
|---|---|---|---|---|
| 6,011,860 | A * | 1/2000 | Fujieda et al. | 382/126 |
| 2004/0208348 | A1* | 10/2004 | Baharav et al. | 382/124 |
| 2006/0227120 | A1* | 10/2006 | Eikman | 345/175 |
| 2006/0262072 | A1* | 11/2006 | Murakami et al. | 345/100 |
| 2008/0006762 | A1* | 1/2008 | Fadell et al. | 250/201.1 |
| 2009/0267919 | A1* | 10/2009 | Chao et al. | 345/175 |
| 2010/0026703 | A1* | 2/2010 | Parker et al. | 345/589 |
| 2010/0079408 | A1* | 4/2010 | Leong et al. | 345/175 |
| 2010/0265178 | A1* | 10/2010 | Benko | G06F 3/03543 345/163 |
| 2010/0278480 | A1* | 11/2010 | Vasylyev | 385/33 |
| 2011/0090515 | A1* | 4/2011 | Hasenohr | 356/614 |
| 2011/0102372 | A1* | 5/2011 | Han et al. | 345/175 |
| 2012/0019481 | A1* | 1/2012 | Lai | 345/175 |
| 2012/0075698 | A1* | 3/2012 | Minami | 359/462 |

(Continued)

FOREIGN PATENT DOCUMENTS

CN 1869905 A 11/2006
TW 201115413 A1 5/2011

OTHER PUBLICATIONS

CN Office Action dated Mar. 30, 2015 in corresponding CN application (No. 201110367670.3).

(Continued)

*Primary Examiner* — Ilana Spar
*Assistant Examiner* — Kirk Hermann
(74) *Attorney, Agent, or Firm* — McClure, Qualey & Rodack, LLP

(57) ABSTRACT

An input device comprising an optical module having a light guide plate, a light source, a scattering layer and a sensor is provided. The light guide plate has a top surface, a bottom surface, and a side. The light source emits a light to the side. The light travels within the light guide plate. The scattering layer changes a path of parts of the light on the bottom surface so that the light is projected out of the top surface to form a penetrating light. When an object approaches or touches the top surface of the light guide plate, at least a part of the penetrating light is reflected by the object to form a reflected light received by the sensor. According to the reflected light, the input device generates a position signal indicating at least one relative position of the object with respect to the top surface.

16 Claims, 5 Drawing Sheets

(56) References Cited

U.S. PATENT DOCUMENTS

2012/0127128 A1* 5/2012 Large et al. .................. 345/175
2013/0045132 A1* 2/2013 Tumanov ....................... 422/24

OTHER PUBLICATIONS

Partial English translation of CN Office Action dated Mar. 30, 2015 in corresponding CN application (No. 201110367670.3).

* cited by examiner

INPUT DEVICE WITH OPTICAL MODULE FOR DETERMINING A RELATIVE POSITION OF AN OBJECT THEREON

This application claims the benefit of priority based on Taiwan Patent Application No. 100141933 filed on Nov. 17, 2011.

CROSS-REFERENCES TO RELATED APPLICATIONS

Not applicable.

BACKGROUND OF THE INVENTION

1. Field of the Invention

The present invention relates to an input device. More particularly, the input device of the present invention determines a relative position of an object with respect to a top surface of a light guide plate by sensing a light reflected by the object on the top surface of the light guide plate.

2. Descriptions of the Related Art

With development of the computer industry, providing well-designed peripheral input devices has become a goal of all manufacturers. Mice and touch panels are the most common input devices for controlling a pointer of an operation system.

A conventional mouse is usually provided with a wheel for scrolling a picture displayed by the operation system or for controlling other operations of the operation system. However, the wheel of the mouse is prone to malfunctions due to oxidation of a micro-switch thereof or abrasion of a bearing thereof during use. On the other hand, a conventional capacitive touch panel tends to become insensitive due to environmental factors (e.g., humidity) during use.

Accordingly, an urgent need exists in the art to provide an input device to avoid the problems with the conventional mice and the conventional capacitive touch panels during use.

SUMMARY OF THE INVENTION

An objective of the present invention is to provide an input device, which determines a relative position of an object with respect to a top surface of a light guide plate by sensing a light reflected by the object on the top surface of the light guide plate. Accordingly, unlike the conventional mice and the conventional capacitive touch panels, the present invention achieves the same input function through optical touch, thereby avoiding the problems with the conventional mice and the conventional capacitive touch panels during use.

To achieve the aforesaid objective, the present invention provides an input device, which comprises an optical module. The optical module comprises a light guide plate, a light source, a scattering layer and a sensor. The light guide plate has a top surface, a bottom surface opposite the top surface, and a side. The light source is disposed adjacent to the side of the light guide plate to emit a light to the side. The light travels within the light guide plate. The scattering layer is configured to change a reflection path of parts of the light on the bottom surface so that the light is projected out of the top surface by the scattering layer to form a penetrating light. The sensor has a viewing angle. The viewing angle covers at least a part of the bottom surface of the light guide plate. When an object approaches or touches the top surface of the light guide plate, at least a part of the penetrating light is reflected by the object to form a reflected light passing through the light guide plate and being received by the sensor. The input device generates a position signal according to the reflected light, and the position signal indicates a relative position of the object with respect to the top surface of the light guide plate.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 2 illustrates an object 3 approaching or touching a region A on a top surface 13a1 of a light guide plate 13a;

FIG. 3 illustrates the object 3 moving from the region A to a region B on the top surface 13a1 of the light guide plate 13a;

DESCRIPTION OF THE PREFERRED EMBODIMENT

Description of the following embodiments is only for purpose of illustration rather than to limit the present invention. It shall be appreciated that, in the following embodiments and the attached drawings, elements unrelated to the present invention are omitted from depiction; and dimensional relationships among individual elements in the attached drawings are illustrated only for ease of understanding but not to limit the actual scale.

Figure 1:
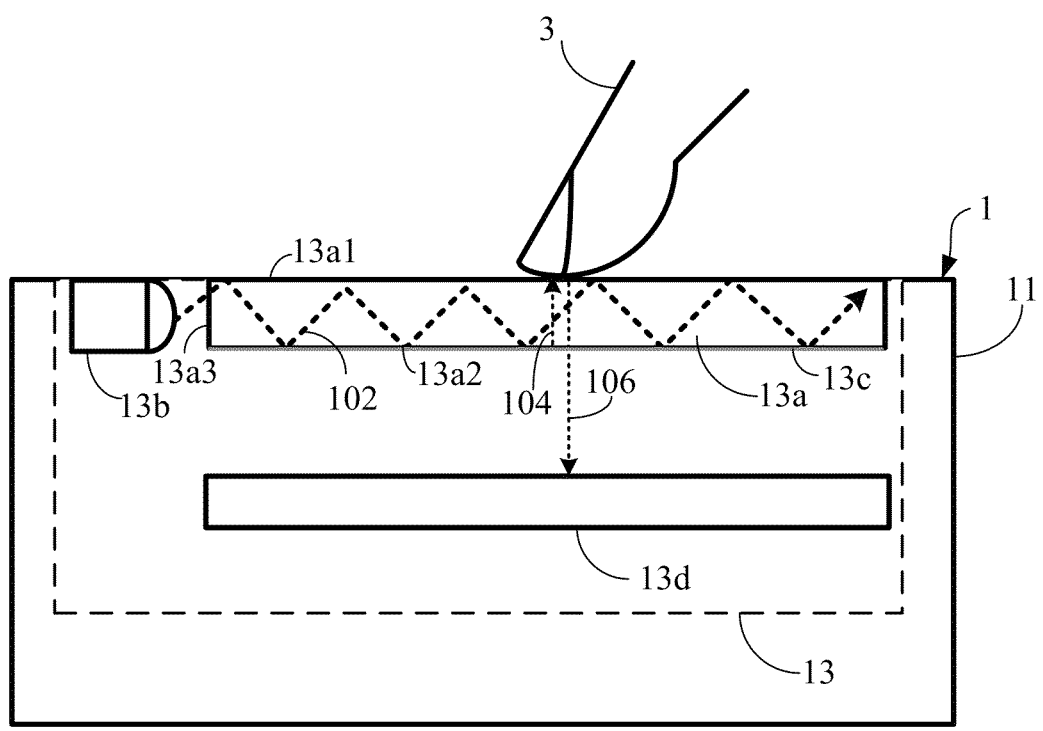
FIG. 1 is a schematic view of an input device 1 according to a first embodiment of the present invention.

FIG. 1 is a schematic view of an input device 1 of the present invention. The input device 1 comprises a housing 11 and an optical module 13. The optical module 13 is disposed within the housing 11. It shall be noted that, for simplicity of description, other elements of the input device 1 such as a key module, a connection interface module, a power supply module and those less related to the present invention are all omitted from depiction.

The optical module 13 comprises a light guide plate 13a, a light source 13b, a scattering layer 13c and a sensor 13d. The light guide plate 13a has a top surface 13a1, a bottom surface 13a2 opposite the top surface 13a1, and a side 13a3. The light source 13b is disposed adjacent to the side 13a3 of the light guide plate 13a to emit a light 102 to the side 13a3. It shall be appreciated that, the light guide plate 13a has four sides, and the light source 13b disposed adjacent to the side 13a3 is only illustrated as an example in this embodiment; however, in other embodiments, the light source 13b may be disposed adjacent to one of the other three sides. The light source 13b may be a light emitting diode (LED), and the light 102 generated by the light source 13b may be one of a visible light, an invisible light and a combination thereof.

The light guide plate 13a is made of a transparent material. When the light 102 is received by the light guide plate 13a from the side 13a3, this transparent material can make the light 102 travel within the light guide plate 13a. The scattering layer 13c is formed on the bottom surface 13a2 of the light guide plate 13a, and may be formed by coating an optical scattering material (e.g., a metal material or some other material having a high reflection coefficient) on the bottom surface 13a2. Furthermore, the scattering layer 13c may also be formed by etching the bottom surface 13a2 to form a plurality of recesses in the bottom surface 13a2. The scattering layer 13c is used to change a reflection path of parts of the light 102 on the bottom surface 13a2 by disrupting the total reflection of the light 102 on the bottom surface 13a2 so that the parts of the light 102 are projected out of the top surface 13a1 by the scattering layer 13c to form a penetrating light 104.

The sensor 13d is disposed below the light guide plate 13a and has a viewing angle. This viewing angle covers at least a part of the bottom surface 13a2 of the light guide plate 13a. In this embodiment, the sensor 13d is a photosensitive element having substantially the same area as the light guide plate 13a. When an object 3 approaches or touches the top surface 13a1 of the light guide plate 13a, at least a part of the penetrating light 104 is reflected by the object 3 to form a reflected light 106. Then, the reflected light 106 passes through the light guide plate 13a and is received by the sensor 13d. Accordingly, the input device 1 can generate a position signal according to the reflected light 106, and the position signal indicates at least one relative position of the object 3 with respect to the top surface 13a1 of the light guide plate 13a.

Figure 2:
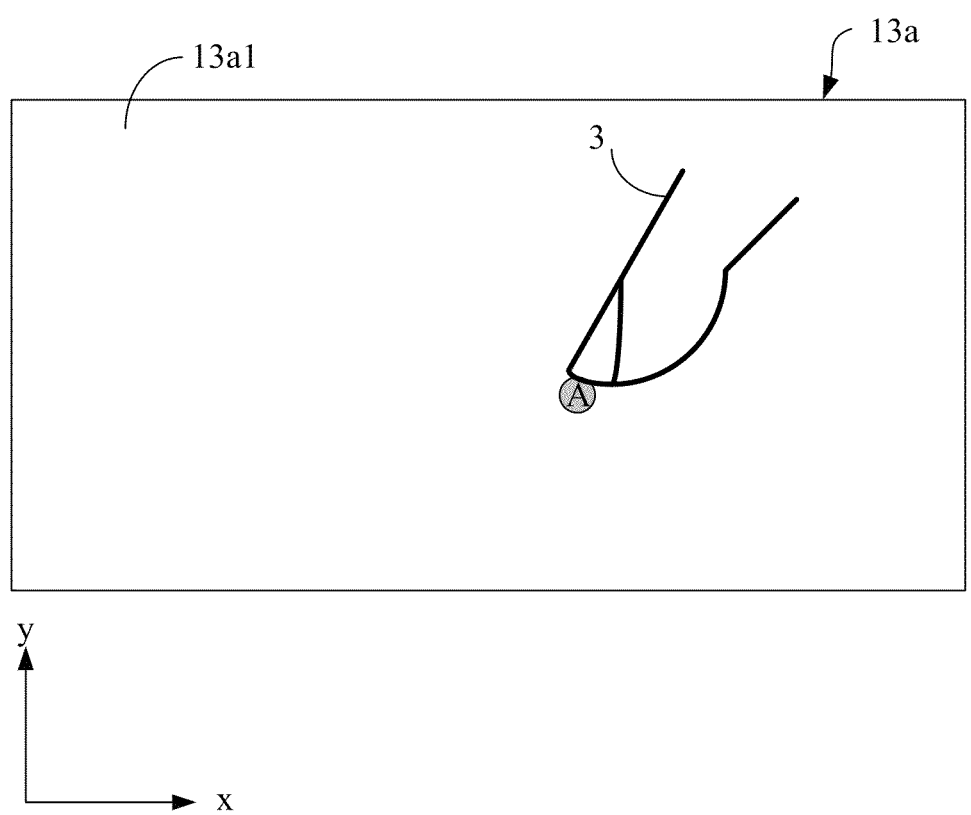

In detail, FIG. 2 shows a top view of the light guide plate 13a. When an object 3 approaches or touches the top surface 13a1 (e.g., a region A) of the light guide plate 13a, the penetrating light 104 is reflected by the object 3 in the region A to form the reflected light 106. The sensor 13d has a plurality of sensing units arranged in a matrix form. When the reflected light 106 is received by the sensor 13d, the sensor 13d generates an intensity value according to the intensity of the reflected light 106 received by the sensing units. Therefore, the input device 1 can generate a position signal according to this intensity value so as to determine that the object 3 approaches or touches the region A on the top surface 13a1 of the light guide plate 13a.

Furthermore, the reflected light 106 is continuously received by the sensor 13d, so the input device 1 can determine a variance of the at least one relative position over time according to the position signals that are continuously generated. When the input device 1 is implemented as a mouse and the optical module 13 is implemented as a mouse wheel, the input device 1 generates a control signal according to the variance and outputs the control signal to a connected computer. Then, an operation system operating in the computer can perform a corresponding action according to the control signal. For example, the control signal may represent one of a 360° scroll action, a click action and a combination thereof. Similarly, when the input device 1 is implemented as a trackpad, the input device 1 also generates a control signal according to the variance; and the control signal may represent one of a pointer moving action, a click action and a combination thereof.

Specifically, the variance includes a horizontal component $\Delta x$ and a vertical component $\Delta y$. The horizontal component $\Delta x$ represents an amount of movement of the object 3 along a first direction (i.e., the x direction) of the top surface. The vertical component $\Delta y$ represents an amount of movement of the object 3 along a second direction (i.e., the y direction) of the top surface. In this embodiment, the x direction and the y direction are orthogonal. As an example, when the object 3 moves away from the region A and then approaches or touches the region A again within a short time period, the input device 1 can determine movement of the object 3 according to variations of the intensity value outputted by the sensor 13d. In this case, because the horizontal component $\Delta x$ and the vertical component $\Delta y$ are substantially equal to 0, the input device 1 outputs a control signal representing a click action.

Figure 3:
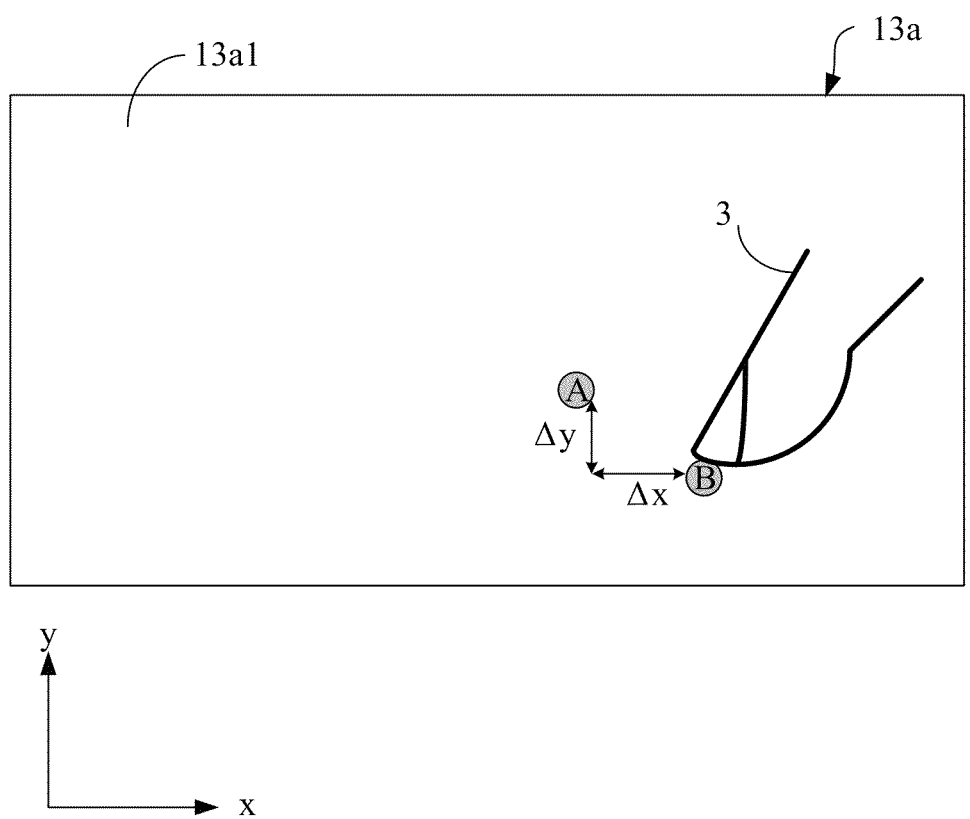

Referring further to FIG. 3 as another example, when the object 3 moves from the region A to a region B, the input device 1 can generate a position signal according to the intensity value outputted by the sensor 13d and then, according to the position signal, determine that the object 3 now approaches or touches the region B on the top surface of the light guide plate 13a. In this case, neither the horizontal component $\Delta x$ nor the vertical component $\Delta y$ is equal to 0, so the input device 1 outputs a control signal representing a 360° scroll action or a pointer moving action.

Figure 4:
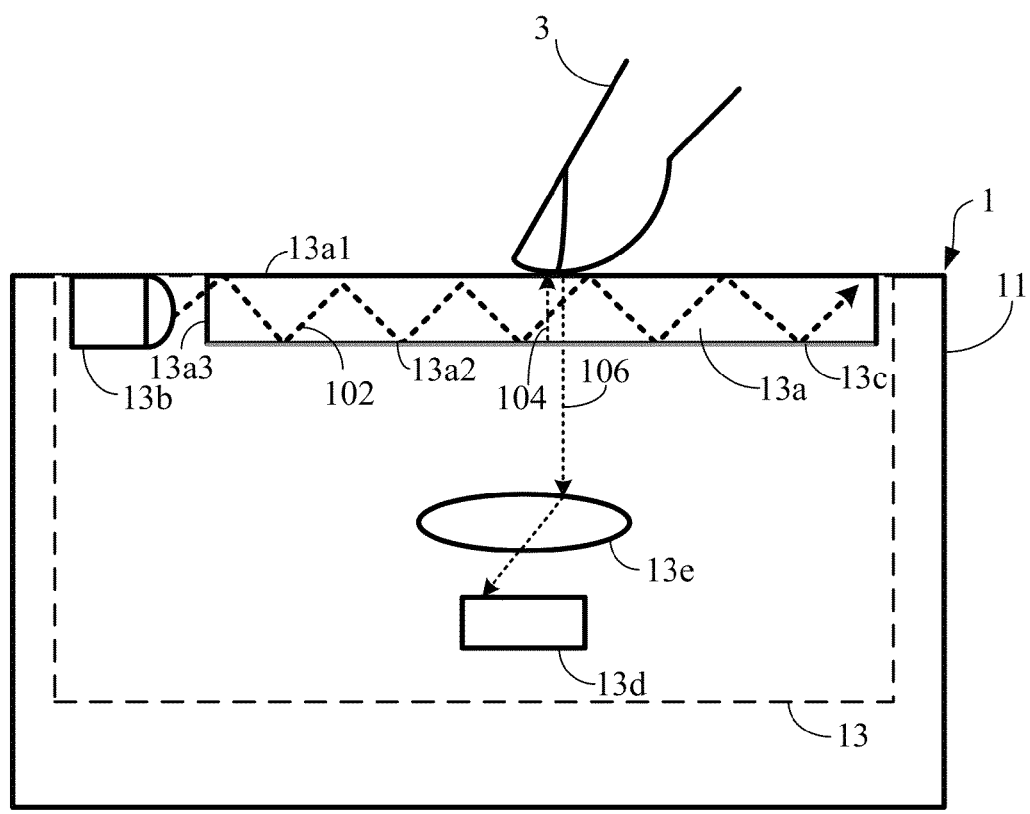
FIG. 4 is a schematic view of the input device 1 according to a second embodiment of the present invention.

A second embodiment of the present invention is shown in FIG. 4, in which a schematic view of another input device 1 of the present invention is shown. Different from the first embodiment, in this embodiment, the sensor 13d of the optical module 13 is a miniature photosensitive element and the optical module 13 further comprises a lens 13e disposed between the light guide plate 13a and the sensor 13d. After penetrating the light guide plate 13a, the reflected light 106 is firstly focused by the lens 13e and then projected to the sensor 13d. After receiving the reflected light 106, the sensor 13d operates in the same way as that in the first embodiment; and thus, this will not be further described herein.

Figure 5:
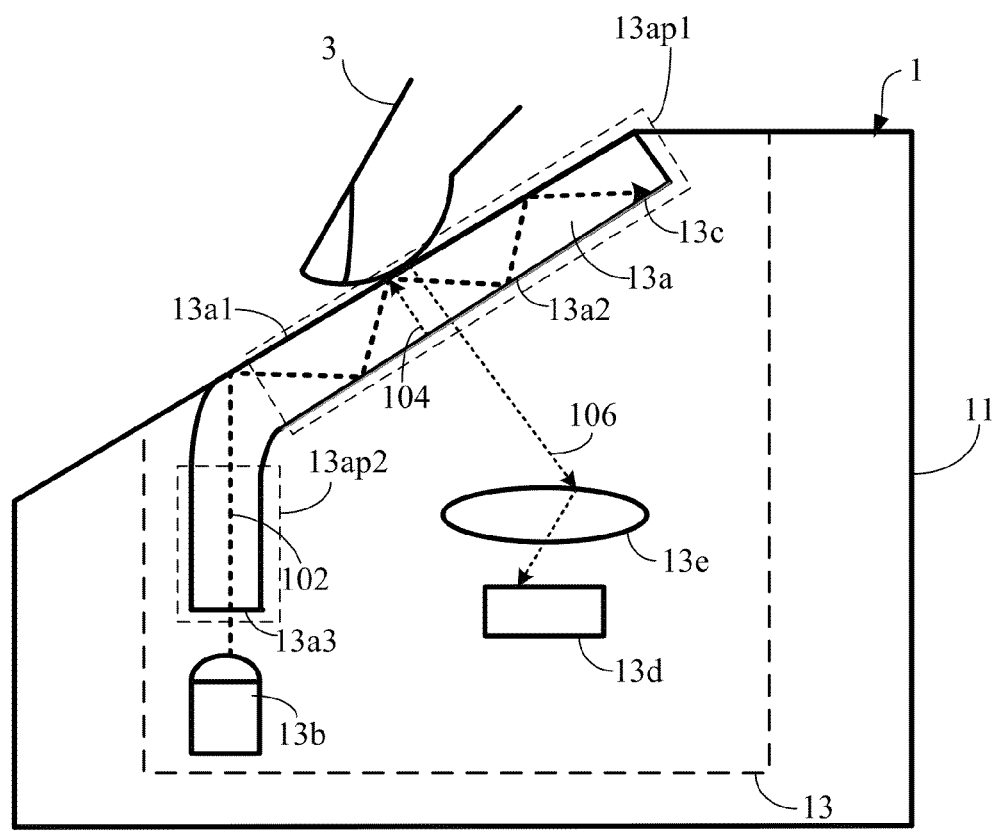
FIG. 5 is a schematic view of the input device 1 according to a third embodiment of the present invention.

A third embodiment of the present invention is shown in FIG. 5, which is a schematic view of another input device 1 of the present invention. Different from the first embodiment and the second embodiment, the light guide plate 13a has a first portion 13ap1 and a second portion 13ap2 in this embodiment. The light guide plate 13a is partially curved so that the first portion 13ap1 and the second portion 13ap2 are in different planes.

It shall be appreciated that, in the first embodiment, the second embodiment and the third embodiment, the sensor 13d and the light source 13b may be disposed in different receiving spaces within the housing 11 so as to prevent the light 102 from being emitted directly to the sensor 13d. Furthermore, the receiving space containing the light source 13b has an opening larger than a size of the light source 13b. On the other hand, the sensor 13d and the light source 13b may also be disposed in a same receiving space with a blocking element disposed therebetween to prevent the light 102 from being emitted directly to the sensor 13d.

It shall be appreciated that, although only a single light source is illustrated in the embodiments of the present invention, a plurality of light sources disposed adjacent to the sides of the light guide plate may be used in order to make the light distribution in the light guide plate 13a more uniform. The light sources may be disposed adjacent to a same side, or may be disposed adjacent to different sides equally. For example, in addition to the light source 13b, the optical module 13 may further comprise another light source disposed adjacent to another side of the light guide plate 13a opposite to the side 13a3 in order to make the light distribution more uniform. Accordingly, embodiments in which a single light source is used and embodiments in which a plurality of light sources are used are both covered within the scope of the present invention.

According to the above descriptions, the input device of the present invention has an optical module, and can determine a relative position of an object with respect to a top surface of a light guide plate by sensing a light reflected by the object on the top surface of the light guide plate. Thus, the input device of the present invention can not only achieve the same input function as the conventional mice and the conventional capacitive touch panels through optical touch, but also avoid the problems with the conventional mice and the conventional capacitive touch panels during use.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An input device, comprising:
    an optical module, comprising:
        a light guide plate, being made of a transparent material, having a top surface, a bottom surface opposite the top surface, and a side, wherein the transparent material makes the light travel in a way of total reflection between the top surface and the bottom surface within the light guide plate;
        a light source, being disposed adjacent to the side of the light guide plate to emit a light to the side, the light traveling within the light guide plate;
        a scattering layer, being formed on the bottom surface and being configured to change a reflection path of the partial light hitting on the bottom surface so that the partial light is projected out of the top surface by the scattering layer to form a penetrating light; and
        a sensor, having a viewing angle covering at least a part of the bottom surface of the light guide plate, wherein when an object approaches or touches the top surface of the light guide plate, at least a part of the penetrating light is reflected by the object to form a reflected light passing through the light guide plate and then being received by the sensor, and the input device generates a position signal according to the reflected light, the position signal indicating at least one relative position of the object with respect to the top surface of the light guide plate;
    wherein the sensor further continuously receives the reflected light so that the input device determines a variance of the at least one relative position over time according to the position signal;
    wherein the input device is a mouse, the optical module is used as a mouse wheel, and the variance is used by the input device to generate a control signal which represents one of a 360° scroll action, a click action and a combination thereof.

2. The input device of claim 1, wherein the optical module further comprises a lens disposed between the light guide plate and the sensor, and the reflected light reflected by the object penetrates the light guide plate and is focused by the lens onto the sensor.

3. The input device of claim 1, wherein the variance includes a horizontal component and a vertical component, the horizontal component represents an amount of movement of the object along a first direction of the top surface, the vertical component represents an amount of movement of the object along a second direction of the top surface, and the first direction and the second direction are orthogonal.

4. The input device of claim 1, wherein the scattering layer is formed by coating an optical scattering material on the bottom surface.

5. The input device of claim 1, wherein the scattering layer is formed by etching the bottom surface to form a plurality of recesses in the bottom surface.

6. The input device of claim 1, wherein the light source is a light emitting diode (LED), and the light is one of a visible light, an invisible light and a combination thereof.

7. The input device of claim 1, further comprising at least one another light source disposed adjacent to the light guide plate.

8. An input device, comprising:
    an optical module, comprising:
        a light guide plate, being made of a transparent material, having a top surface, a bottom surface opposite the top surface, and a side, wherein the transparent material makes the light travel in a way of total reflection between the top surface and the bottom surface within the light guide plate;
        a light source, being disposed adjacent to the side of the light guide plate to emit a light to the side, the light traveling within the light guide plate;
        a scattering layer, being formed by coating an optical scattering material on the bottom surface and being configured to change a reflection path of the partial light hitting on the bottom surface so that the partial light is projected out of the top surface by the scattering layer to form a penetrating light; and
        a sensor, having a viewing angle covering at least a part of the bottom surface of the light guide plate, wherein when an object approaches or touches the top surface of the light guide plate, at least a part of the penetrating light is reflected by the object to form a reflected light passing through the light guide plate and then being received by the sensor, and the input device generates a position signal according to the reflected light, the position signal indicating at least one relative position of the object with respect to the top surface of the light guide plate.

9. The input device of claim 8, wherein the optical module further comprises a lens disposed between the light guide plate and the sensor, and the reflected light reflected by the object penetrates the light guide plate and is focused by the lens onto the sensor.

10. The input device of claim 8, wherein the sensor further continuously receives the reflected light so that the input device determines a variance of the at least one relative position over time according to the position signal.

11. The input device of claim 10, wherein the input device is a mouse, the optical module is used as a mouse wheel, and the variance is used by the input device to generate a control signal which represents one of a 360° scroll action, a click action and a combination thereof.

12. The input device of claim 11, wherein the variance includes a horizontal component and a vertical component, the horizontal component represents an amount of movement of the object along a first direction of the top surface, the vertical component represents an amount of movement of the object along a second direction of the top surface, and the first direction and the second direction are orthogonal.

13. The input device of claim 10, wherein the input device is a trackpad, and the variance is used by the input device to generate a control signal which represents one of a pointer moving action, a click action and a combination thereof.

14. The input device of claim 13, wherein the variance includes a horizontal component and a vertical component, the horizontal component represents an amount of movement of the object along a first direction of the top surface, the vertical component represents an amount of movement of the object along a second direction of the top surface, and the first direction and the second direction are orthogonal.

15. The input device of claim 8, wherein the light source is a light emitting diode (LED), and the light is one of a visible light, an invisible light and a combination thereof.

16. The input device of claim 8, further comprising at least one another light source disposed adjacent to the light guide plate.

* * * * *